(12) United States Patent
Shih et al.

(10) Patent No.: US 6,255,744 B1
(45) Date of Patent: Jul. 3, 2001

(54) BACK-UP POWER DEVICE AND APPLICATIONS THEREOF

(75) Inventors: Fu Yuan Shih; Yen-Chung Hsu; Chia-Hung Hsieh, all of Taoyuan Hsien (TW); Bernard Lioux, Saint Martin d'Uriage (FR)

(73) Assignees: Delta Electronics, Inc. (TW); Hewlett Packard Company, Palo Alto, CA (US)

(*) Notice: Subject to any disclaimer, the term of this patent is extended or adjusted under 35 U.S.C. 154(b) by 0 days.

(21) Appl. No.: 09/396,645

(22) Filed: Sep. 15, 1999

(51) Int. Cl.[7] .................................................. H02J 7/00
(52) U.S. Cl. .............................................. 307/66; 307/64
(58) Field of Search .............................. 307/64, 65, 66; 361/683, 686, 724, 725, 726

(56) References Cited

U.S. PATENT DOCUMENTS

| | | | |
|---|---|---|---|
| 4,860,185 | 8/1989 | Brewer et al. | 363/41 |
| 5,289,045 | 2/1994 | Lavin et al. | 307/64 |
| 5,631,814 | * 5/1997 | Zak | 363/37 |
| 5,748,972 | 5/1998 | Clark et al. | 395/750.05 |
| 5,777,398 | * 7/1998 | Valkeakari et al. | 307/66 |

FOREIGN PATENT DOCUMENTS

WO 98/34314  *  1/1998  (WO).

\* cited by examiner

*Primary Examiner*—Fritz Fleming
(74) *Attorney, Agent, or Firm*—Skjerven Morrill MacPherson LLP; Edward C. Kwok

(57) ABSTRACT

A built-in back-up power device operates a high-power apparatus for a short time period to prevent the loss of data or damage to the apparatus when power from a utility power source is interrupted. The built-in back-up power device includes a battery and a charger. The charger charges the battery when power is provided from the utility power source. During a power interruption or outage, the battery outputs back-up power to the high-power apparatus. A computer with such a built-in back-up power device is also provided.

14 Claims, 6 Drawing Sheets

BACK-UP POWER DEVICE AND APPLICATIONS THEREOF

BACKGROUND OF THE INVENTION

1. Field of the Invention

The present invention relates to a back-up power device and its application. More particularly, the present invention relates to a built-in back-up power device and its application.

2. Discussion of the Related Art

Computers have become so inexpensive that their use is widespread. Many computers are used, for example, in controlling production lines, calculation, and entertainment. A good back-up power source is thus becoming more important to prevent data loss in a power outage, interruption or glitch. The typical back-up power source is an uninterrupted power supply (UPS), which is designed to provide the computer with a stable power source to continue normal operations for a relatively long period of time after a power outage has occurred. For example, a work station is typically equipped with an UPS to allow uninterrupted operation. To provide such a stable power source over a relatively long period of time, a UPS is complex and expensive beyond the reach of the average user.

FIG. 1 is a block diagram showing a personal computer 11 equipped with conventional UPS 12. Internal power supply 13 of personal computer 11 includes electromagnetic interference (EMI) filter and power factor controller (PFC) 131, AC/DC converter 132, DC/DC converter 133, and feedback circuit 134. EMI filter and PFC 131 eliminate noise in the AC input power. The filtered AC input power is converted to high-voltage DC power by AC/DC converter 132. Then, the high-voltage DC power is converted to low-voltage DC power by DC/DC converter 133 to provide an operating voltage to personal computer 11, which includes, for example, a mainboard, a floppy disk drive, a hard disk drive (HDD), a compact disc read-only memory (CD-ROM) reader. Feedback circuit 134 adjusts the filtered AC input power in response to the high-voltage DC power output. Thus, since there is no power-storing unit in internal power supply 13, the low-voltage DC power output is interrupted immediately after the AC input power is interrupted. When such a power interruption occurs, personal computer 11 is improperly shut down. In computers running high-level operating system such as Windows 95/98, Windows NT, or UNIX, a power interruption can leave the operating system in an inconsistent state, leading to loss of data and time and labor expenses in restoring the operating system to a consistent state.

UPS 12 avoids data loss from a power interruption by providing stable AC input power. As shown in FIG. 1, UPS 12 includes EMI filter and PFC 121, AC/DC converter 122, DC/AC converter 123, charger 124, and battery 125. When the AC input power from the utility power source is operating, the filtered AC input power provides a converted AC power through the AC/DC converter 122 and DC/AC converter 123. The converted AC power is supplied to internal power supply 13 and is used to charge battery 125 through charger 124. When a power interruption occurs, battery 125 discharges to maintain a DC output to DC/AC converter 123 which, in turn, maintains the converted AC power. Hence, UPS 12 provides internal power supply 13 with stable AC input power during a power interruption for as long as battery 125 can continue to supply the DC output to DC/AC converter 123.

UPS 12 suffers, however, from some disadvantages. First, UPS 12 is complex and expensive. For home or simple office use, the cost of an expensive UPS outweighs its benefits of preventing data loss. Since only 3 to 5 minutes of uninterrupted power is required to shut down a computer properly during a power interruption, a simpler and less expensive back-up power unit which provides a personal computer power only for such a short period is desired.

SUMMARY OF THE INVENTION

The present invention provides a built-in backup power device which can provide a high-power apparatus with back-up power for a short period to respond to a power interruption.

The present invention also provides a personal computer with built-in back-up power device to prevent data loss and inconsistent operating system state during a power interruption.

In accordance with the present invention, the back-up power device includes a power-storing unit (e.g., a battery) connected to a charger. Under normal operation, the charger charges the battery. During power interruption, the battery discharges to provide a personal computer with back-up power, for 2 to 10 minutes.

In accordance with another aspect of the present invention, the back-up power device preferably includes an output circuit, such as a pumping circuit or a DC/DC converter, for converting the back-up power to a power suitable for operating various units of the personal computer. The back-up power device includes a controller operatively coupled to the charger and the output circuit. Under normal operating conditions, the controller controls the charger's charging of the battery. During a power interruption, the controller controls the output circuit to output suitable power for operating the personal computer.

In accordance with the another aspect of the present invention, the back-up power device preferably includes a power detector and an indicator. The power detector detects whether or not utility power is normal and the indicator indicates whether normal operating conditions prevail. During a power interruption, the indicator indicates power interruption to alert a user, so that a pre-determined shut-down procedure can be followed to thereby avoid data loss and inconsistent operating system state. In one embodiment, the back-up power device includes an auxiliary power source which operates the charger.

In accordance with the present invention, a computer with a back-up power device is provided. Under normal operating conditions, the back-up power device stores back-up power. During a power interruption, the back-up power device provides the computer with the stored back-up power for a short period ranging from 2 to 10 minutes. The computer includes electronic units such as a mainboard, a floppy disk drive, hard disk drive, and a compact disc read-only memory (CD-ROM) reader. The computer further includes an internal power supply for converting utility power or the back-up power to low-voltage DC power to operate memory units. The internal power supply further includes an AC/DC converter for converting the utility power to a high-voltage DC power, and a DC/DC converter for converting the high-voltage DC power to low-voltage DC power (e.g., at the operating voltage of the computer).

In accordance with another aspect of the present invention, in one embodiment, the battery and the charger are electrically connected to an input terminal of the DC/DC converter and to an output terminal of the AC/DC converter respectively. In another embodiment, the battery and the charger are electrically connected to the electronic units and to an output terminal of the DC/DC converter respectively. The built-in back-up power device can be removably mounted, and is coupled to the personal computer by using connectors.

The present invention is better understood upon consideration of the following detailed description with reference to the accompanying drawings.

DETAILED DESCRIPTION OF THE PREFERRED EMBODIMENT

Figure 1:
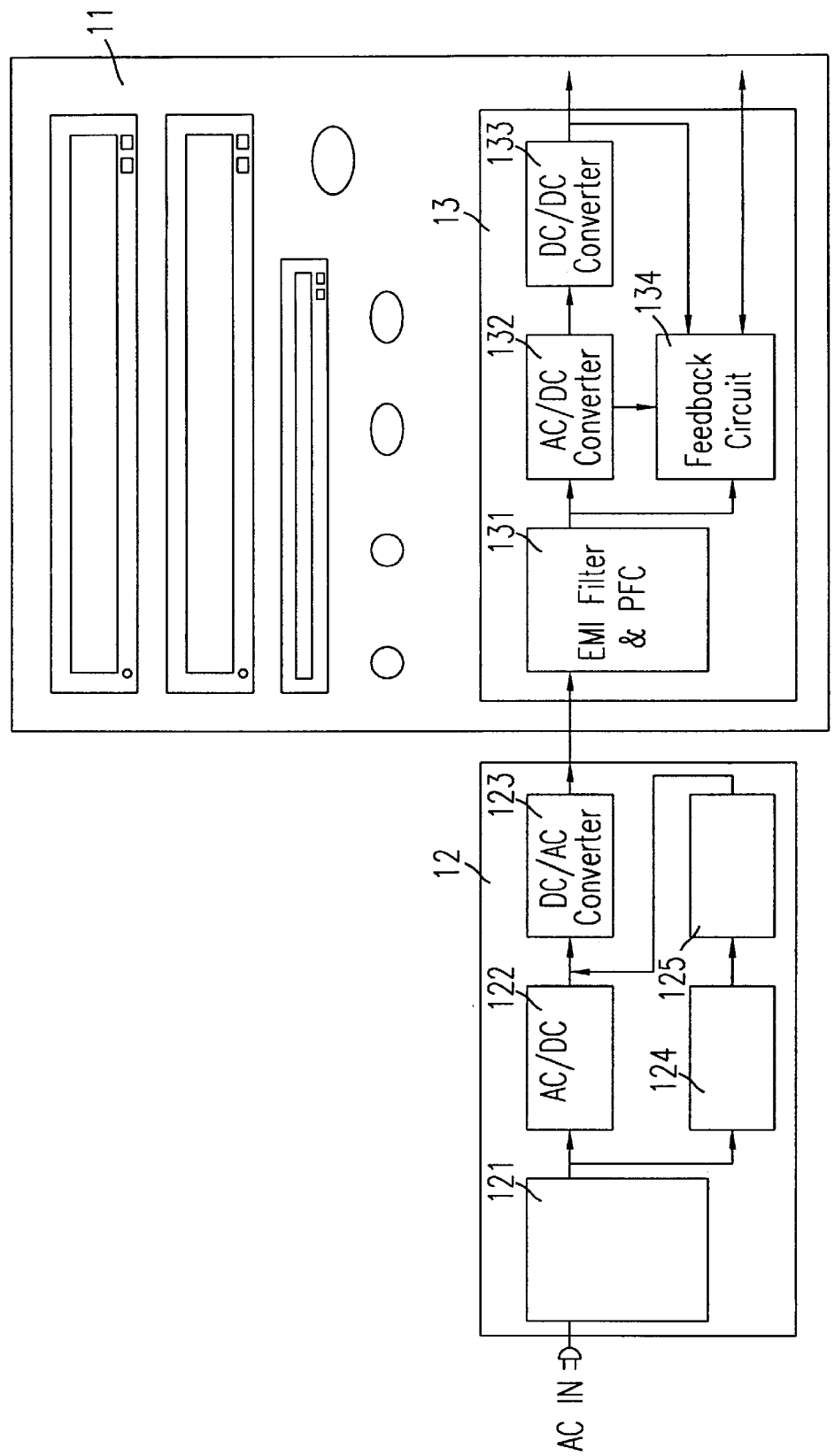
FIG. 1 is a schematic block diagram showing the use of a personal computer equipped with a conventional uninterrupted power supply.
Figure 2:
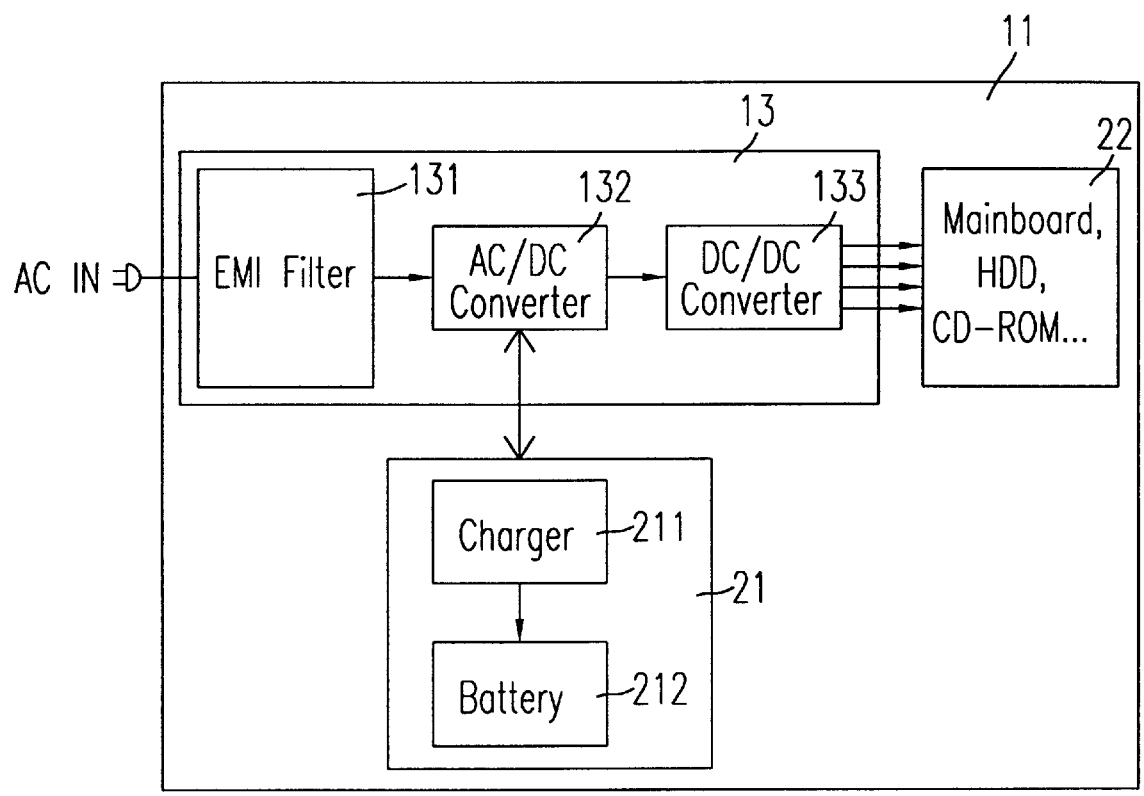
FIG. 2 is a schematic block diagram showing a computer equipped with a built-in back-up power device, according to one embodiment of the present invention.

FIG. 2 shows a schematic block diagram showing a computer equipped with a built-in back-up power device, according to one embodiment of the present invention. Built-in back-up power device 21 is mounted in personal computer 11. Built-in back-up power device 21 includes charger 211 and battery 212. Built-in back-up power device 21 is therefore simpler than those of a conventional uninterrupted power supply. The simpler construction allows built-in back-up power device 21 to be inexpensive and compact enough to be conveniently mounted in personal computer 11. Internal power supply 13 of personal computer 11 is conventional, and thus not further described here. Under normal operating conditions, charger 211 charges battery 212, using the high-voltage DC power from AC/DC converter 132. During power interruption, battery 212 discharges to provide the DC/DC converter 133 with back-up power at a high DC voltage. DC/DC converter 133 converts the back-up power to a low DC voltage (e.g., the operating voltage of personal computer 11) to supply electronic units 22 of personal computer 11. Electronic unit 22 typically includes, for example, a mainboard, a floppy disk drive, a hard disk drive, and a CD-ROM reader. Battery 212 supplies about 2 to 10 minutes of power at personal computer 11's normal rate of power consumption, sufficient to properly save data into the hard disk drive or properly shut down the personal computer. Built-in back-up power device 11 thus provides the average user an inexpensive alternative to a conventional uninterrupted power supply.

Figure 3:
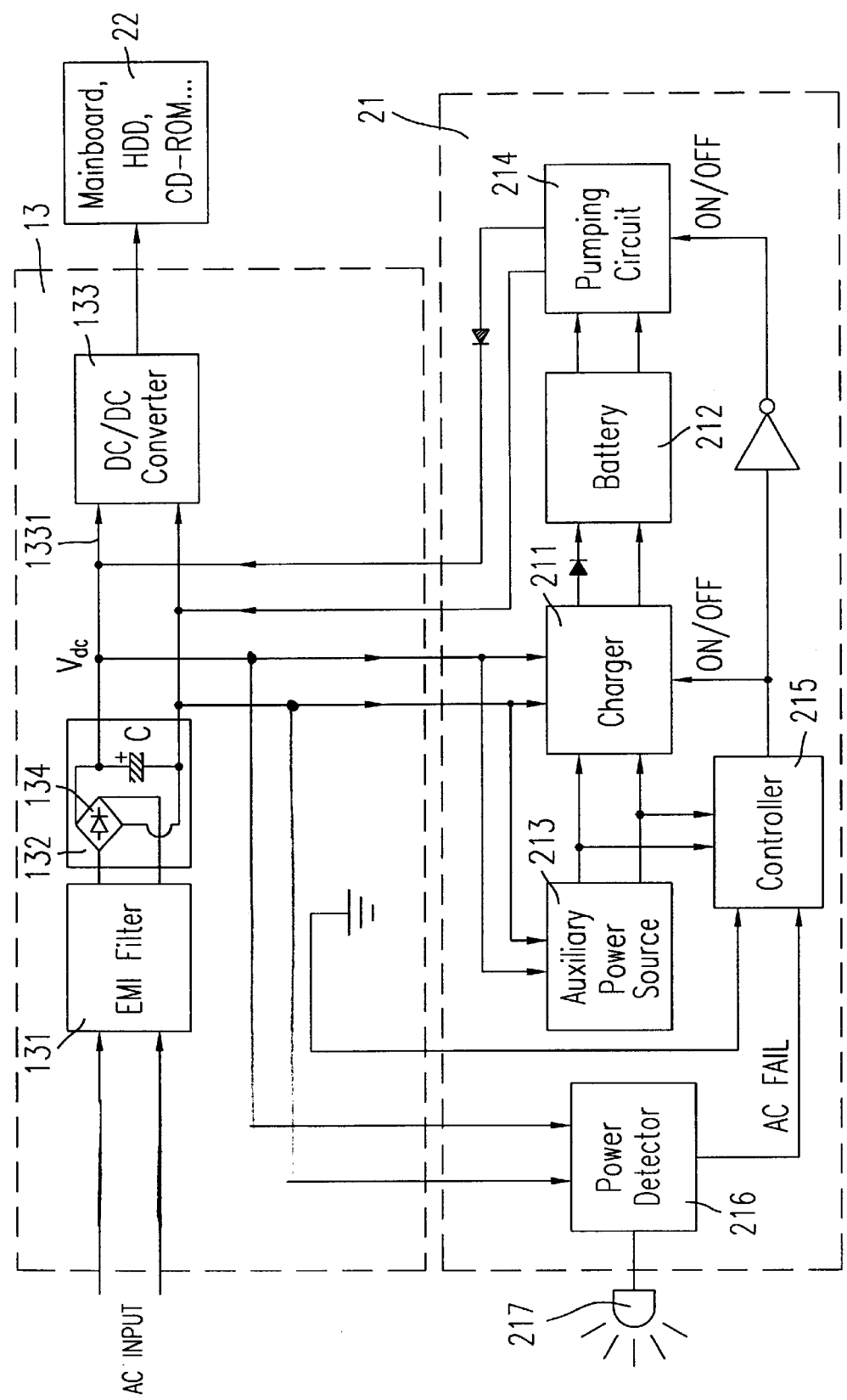
FIG. 3 is a detailed block diagram showing the computer with the built-in back-up power device of FIG. 2.

FIG. 3 is a detailed block diagram showing a computer with the built-in back-up power device of FIG. 2. Utility power is received as an AC input signal. After being filtered to eliminate electromagnetic interference, the AC input power is converted to a high voltage DC power signal, indicated by voltage $V_{dc}$ by AC/DC converter 132. AC/DC converter 132 typically includes bridge rectifier 134 and filter capacitor C. Power detector 216 detects presence of voltage $V_{dc}$. Under normal operating conditions, controller 215 sets charger 211 in an "ON" state and pumping circuit 214 in an "OFF" state. Charger 211 charges the battery 212 by using the high-voltage DC power $V_{dc}$. During a power interruption, detector 216 outputs an "AC FAIL" signal to controller 215 to alert controller 215 of the power interruption. Controller 215 then sets charger 211 in an "OFF" state and pumping circuit 214 in an "ON" state. In this configuration, the back-up power stored in battery 212 is converted to a high-voltage DC power using pumping circuit 214 and is provided to an input terminal 1331 of DC/DC converter 133. The high-voltage DC power is converted to a low voltage DC power (e.g., an operating voltage of personal computer 11) to operate electronic units 22 of personal computer 11. At the same time, the indicator 217 alerts the user of the abnormal power condition, using, for example, a flashing light or an audible sound. Built-in back-up power device 21 can also include auxiliary power source 213 to operate charger 211.

Figure 4:
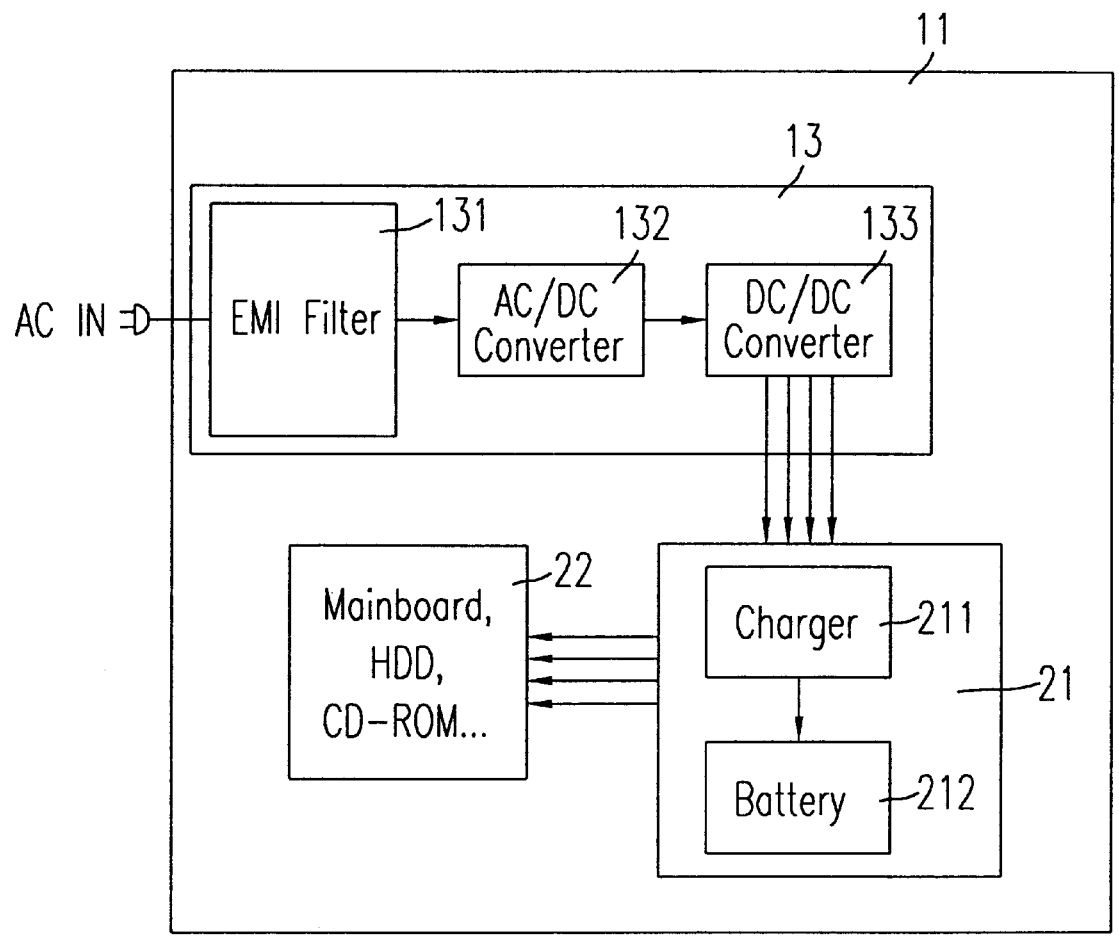
FIG. 4 is a schematic block diagram showing a computer equipped with a built-in back-up power device, according to another embodiment of the present invention.

In the embodiment shown in FIG. 3, charger 211 is electrically connected to an output terminal of AC/DC converter 132 to receive the high DC voltage $V_{dc}$. A second embodiment which provides further safety is shown in FIG. 4. FIG. 4 is a schematic block diagram showing another computer equipped with a built-in backup power device. The internal structure of built-in back-up power device 21 of FIG. 4 is substantially the same as that described above. In this instance, however, built-in back-up power device 21 is electrically connected between DC/DC converter 133 and electronic units 22 to receive the low-voltage DC power to comply with safety standards.

Figure 5:
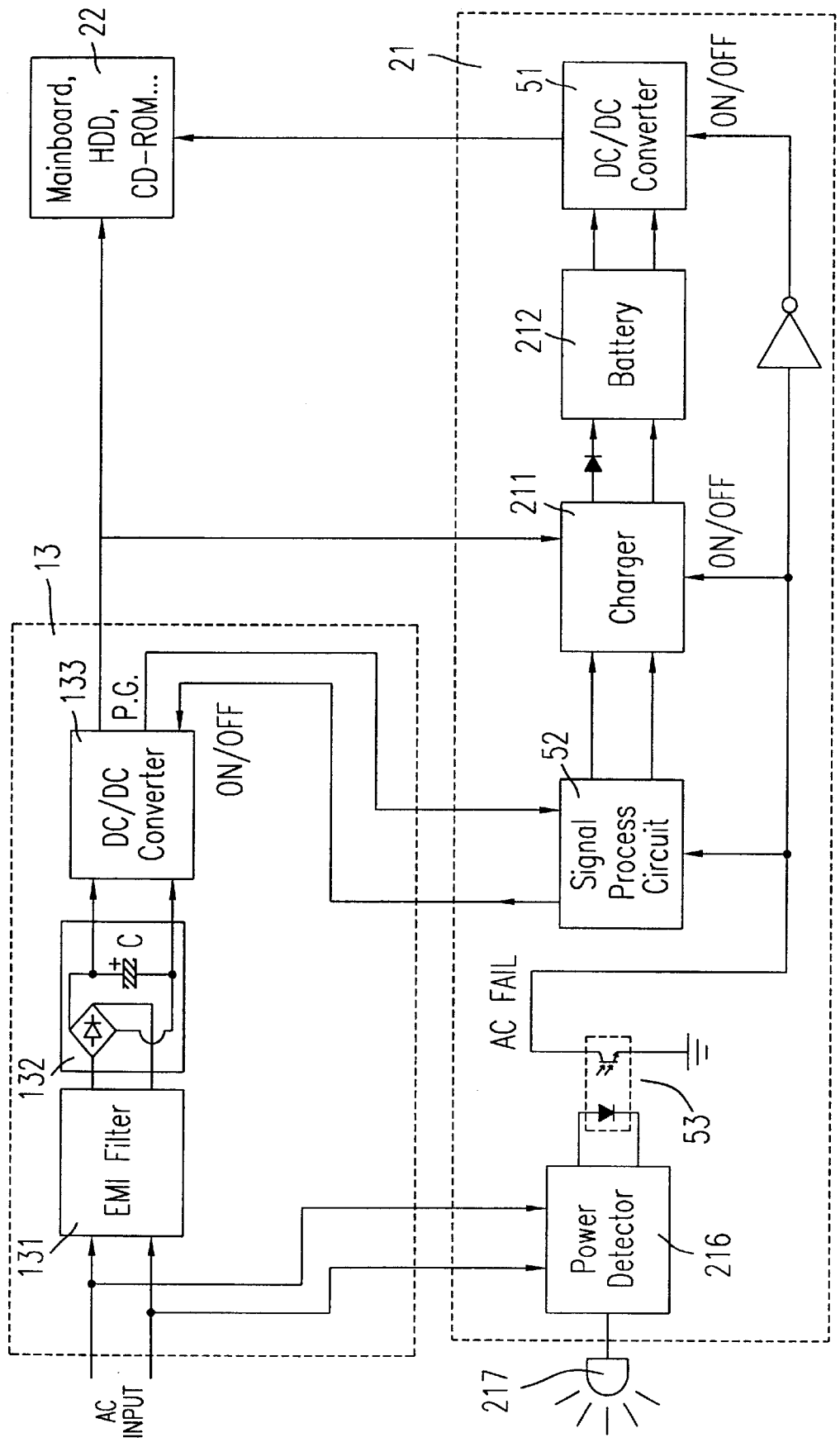
FIG. 5 is a detailed block diagram showing the computer with the built-in back-up power device of FIG. 4.

FIG. 5 is a detailed block diagram showing the computer with the built-in back-up power device of FIG. 4. In internal power supply 13 of FIG. 5, after the utility power is filtered to eliminate electromagnetic interference by EMI filter 131, AC/DC converter 132 provides high voltage DC power (voltage $V_{dc}$). The high voltage DC power is then stepped down by DC/DC converter 133 to low voltage DC power.

Built-in back-up power device 21 receives utility power as the AC input power. Power detector 216 detects the state of the utility power at all times, and provides an output signal, which is transformed by optical coupling transistor 53 as an input signal to signal processing circuit 52, charger 211, and DC/DC converter 51. Under normal operating conditions, charger 211 is in an "ON" state and DC/DC converter 51 is in an "OFF" state. Charger 211 charges the battery 212 using the low-voltage DC power from DC/DC converter 133. During a power interruption, optical coupling transistor 53 transmits an "AC FAIL" signal to signal processing circuit 52, charger 211 and the DC/DC converter 51. Charger 211 switches to an "OFF" state and DC/DC converter 51 switches to an "ON" state. Consequently, the backup power stored in battery 212 is converted to DC power at a suitable voltage by DC/DC converter 51, which is then provided to the electronic units 22 of personal computer 11. At the same time, indicator 217 is enabled by the "AC FAIL" signal to alert the user of the power interruption. Indicator 217 can be implemented by any output circuit providing, for example, flashing light or sound.

Signal processing circuit 52 is electrically connected to an output terminal of DC/DC converter 133 to receive a "power good" (P.G.) signal, which indicates low voltage DC output power is provided under normal operating conditions. During a power interruption, signal processing circuit 52 sends a feedback signal to DC/DC converter 133 to stop DC/DC converter 133's operations.

Figure 6:
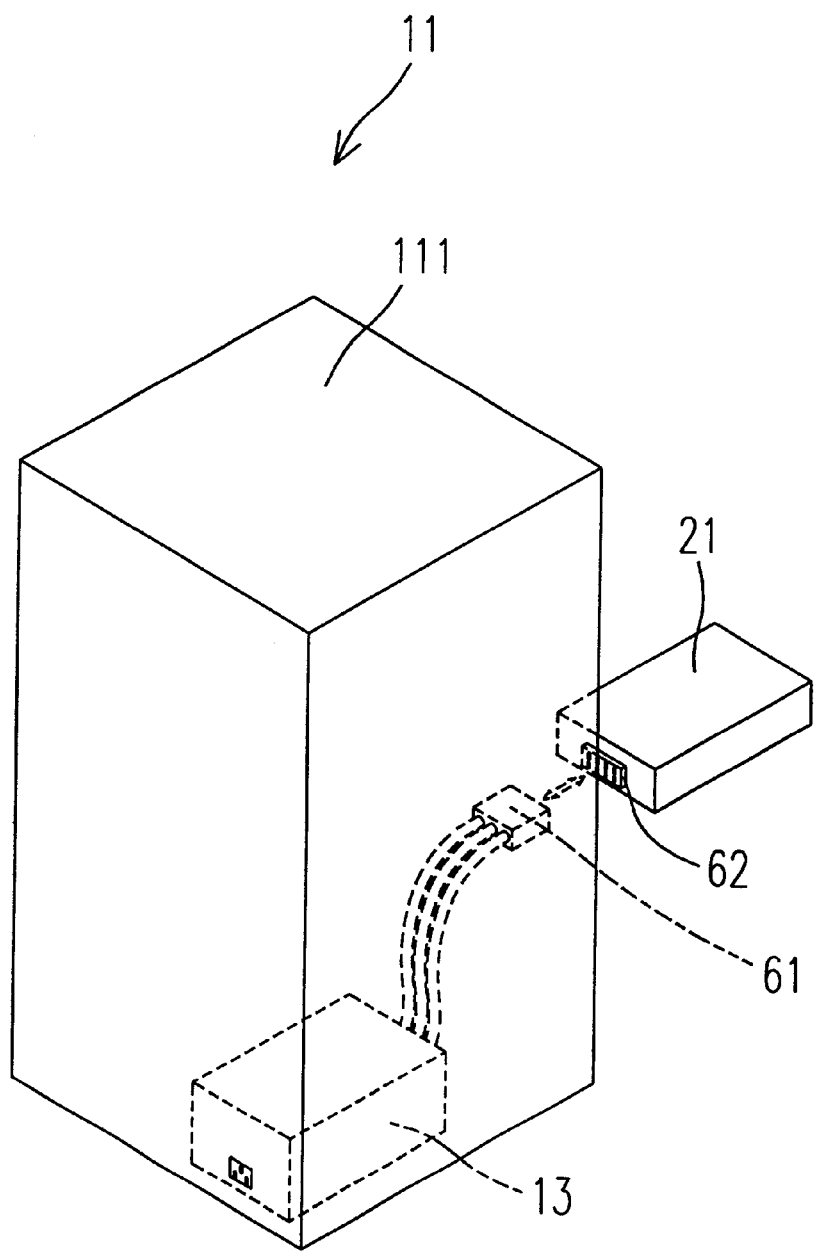
FIG. 6 is a perspective diagram showing the use of a built-in back-up power device according to the present invention.

FIG. 6 is a perspective view showing use of a built-in back-up power device in an equipment housing or case 111, according to the present invention. Built-in back-up power device 21 can be installed in any available space in case 111 of personal computer 11. Such space can be, for example, a conventional 5¼-inch floppy disk drive bay. Thus, built-in back-up power device 21 can be provided a housing designed to fit a 5¼-inch floppy disk drive bay. Built-in back-up power device 21 can then be coupled through connectors 61 and 62 to internal power supply 13. For greater convenience, built-in back-up power device 21 can be removably mounted.

A built-in back-up power device of the present invention can be used to operate any of numerous high-power apparati for short time periods of power interruption (e.g., 10 minutes).

While the invention has been described above in the specific and preferred embodiments, the present invention is not so limited. On the contrary, various modifications and variations within the scope of the present invention are possible. The present invention is set forth in the appended claims.

What is claimed is:

1. A computer system receiving AC input power, comprising:
   a case;
   a computer mounted in said case;
   a power supply unit in said case receiving said AC input power and providing operative voltage DC power to operate said computer, said power supply unit including:
      (a) an AC/DC converter for converting said input AC power to a DC power having a higher voltage than the voltage of said operative voltage DC power; and
      (b) a DC/DC converter electrically coupled to said AC/DC converter for converting said high-voltage DC power to said operative voltage DC power; and
   a back-up power device removably mounted in a data storage accessory bay in said case, said back-up power device being electrically coupled to said computer and including (a) a power detector coupled to said AC/DC converter for detecting supply of said AC input power, (a) a charger including an auxiliary power source for operating said charger, and (c) a battery coupled to be charged by said charger, such that said back-up power device stores back-up power in said battery, when supply of said AC input power is detected by said power detector, and provides said stored back-up power from said battery to operate said computer, when said supply of said AC input power is not detected by said power detector.

2. The computer system of claim 1 wherein said computer system comprising a personal computer.

3. The computer system of claim 1, wherein said computer comprises a mainboard, a floppy disk drive, a hard disk drive, and a compact disc read-only memory.

4. The computer system of claim 3, wherein said back-up power device further comprises a controller electrically connected to said charger for causing said charger to charge said battery.

5. The computer of claim 4, wherein said power detector is electrically connected to said controller to detect the state of said AC input power, and providing a signal to said controller indicating said state of said AC input power, said computer further comprising an indicator electrically connected to said power detector for indicating said state of said AC input power.

6. The computer system of claim 1, wherein (a) said battery is electrically coupled to an input terminal of said computer; and (b) said charger is electrically connected to an output terminal of said DC/DC converter and to said battery, said charger using said operative voltage DC power to charge said battery.

7. The computer system of claim 1, wherein (a) said battery is electrically coupled to an input terminal of said DC/DC converter; and (b) said charger is electrically connected to said battery and an output terminal of said AC/DC converter, said charger charging said battery using said higher voltage DC power.

8. The computer system of claim 1 wherein said back-up power is capable of operating said computer for a period of time between 2 minutes to 10 minutes during a power interruption.

9. The computer system of claim 1 wherein said back-up power device is removably mounted in said case.

10. A built-in back-up power device adapted for providing back-up power to an apparatus receiving AC input power, said built-in back-up power device comprising:
    a power detector coupled to said AC input power;
    an output circuit coupled to provide power to said apparatus;
    a battery for storing said back-up power when said AC input power is detected by said power detector, and for discharging said back-up power into said output circuit, when supply of said AC input power is not detected by said power detector;
    a charger electrically connected to said battery for charging said battery using said AC input power,
    an auxiliary power source electrically connected to said charger for operating said charger; and
    a controller for controlling charger and said output circuit to perform said storing and discharging operations of said battery.

11. The built-in back-up power device of claim 10 wherein said apparatus comprises a computer.

12. The built-in back-up power device of claim 10 where in said power detector being electrically connected to said controller and providing said controller a signal indicating said state of said AC input power.

13. The built-in back-up power device of claim 10, wherein said built-in back-up power device further comprises an indicator electrically connected to said power detector for indicating said state of said AC input power.

14. The built-in back-up power device of claim 10, wherein said back-up power provides said apparatus operative power for a period of time between 2 to 10 minutes.

* * * * *